United States Patent
Yamashita et al.

(10) Patent No.: US 10,174,690 B2
(45) Date of Patent: Jan. 8, 2019

(54) AUXILIARY-MACHINE CONTROL DEVICE, CONTROL SYSTEM, TURBOCHARGER, CONTROL METHOD, AND PROGRAM

(71) Applicant: MITSUBISHI HEAVY INDUSTRIES, LTD., Tokyo (JP)

(72) Inventors: Yukio Yamashita, Tokyo (JP); Hiroyoshi Kubo, Tokyo (JP); Mitsufumi Goto, Tokyo (JP); Musashi Sakamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/521,437

(22) PCT Filed: Feb. 5, 2015

(86) PCT No.: PCT/JP2015/053300
§ 371 (c)(1),
(2) Date: Apr. 24, 2017

(87) PCT Pub. No.: WO2016/067642
PCT Pub. Date: May 6, 2016

(65) Prior Publication Data
US 2017/0314479 A1    Nov. 2, 2017

(30) Foreign Application Priority Data
Oct. 28, 2014 (JP) .................. 2014-219435

(51) Int. Cl.
*F02D 41/00* (2006.01)
*F02D 23/00* (2006.01)
(Continued)

(52) U.S. Cl.
CPC .......... *F02D 41/0007* (2013.01); *F02B 37/18* (2013.01); *F02D 23/00* (2013.01);
(Continued)

(58) Field of Classification Search
USPC .................. 701/102–104, 108–110
See application file for complete search history.

(56) References Cited

U.S. PATENT DOCUMENTS 5,551,235 A    9/1996    Entenmann et al.
5,680,763 A    10/1997   Unland et al.
(Continued)

FOREIGN PATENT DOCUMENTS

DE    4344960 A1    7/1995
DE    19502150 C1   5/1996
(Continued)

OTHER PUBLICATIONS

Extended European Search Report for European Application No. 15854139.1, dated Sep. 1, 2017.
(Continued)

*Primary Examiner* — John Kwon
*Assistant Examiner* — Johnny H Hoang
(74) *Attorney, Agent, or Firm* — Birch, Stewart, Kolasch & Birch, LLP (57) ABSTRACT

An auxiliary-machine control device equipped with: a command-value acquisition unit for acquiring an operation command value for a device to be controlled and an allowable range for the operation amount of control means for controlling the operating state of the device to be controlled; an operation-amount calculation unit for calculating the operation amount for the control means on the basis of the acquired operation command value; and an operation-amount determination unit for outputting the calculated operation-amount signal to the device to be controlled if the operation amount calculated by the operation-amount calculation unit falls within the allowable range, and outputting an upper-limit value or a lower-limit value for the operation-
(Continued)

amount allowable range if the calculated operation amount falls outside of the allowable range.

11 Claims, 4 Drawing Sheets

(51) Int. Cl.
*F02D 41/26* (2006.01)
*F02B 37/18* (2006.01)
*F02D 9/02* (2006.01)
*F02D 41/20* (2006.01)
*F02D 41/14* (2006.01)
*F02B 37/00* (2006.01)

(52) U.S. Cl.
CPC .............. *F02D 41/26* (2013.01); *F02B 37/00* (2013.01); *F02D 2009/0296* (2013.01); *F02D 2041/1433* (2013.01); *F02D 2041/2048* (2013.01); *F02D 2200/0406* (2013.01); *F02D 2200/10* (2013.01); *Y02T 10/144* (2013.01)

(56) References Cited

U.S. PATENT DOCUMENTS

| | | | |
|---|---|---|---|
| 6,292,739 | B1 | 9/2001 | Yasui et al. |
| 2002/0062183 | A1* | 5/2002 | Yamaguchi ............ B60K 6/46 701/22 |
| 2006/0074542 | A1 | 4/2006 | Kikutani |
| 2007/0095051 | A1* | 5/2007 | Iihoshi ................. F01N 11/007 60/277 |
| 2007/0288130 | A1* | 12/2007 | Lemoult ............. G05D 1/0083 701/14 |
| 2010/0191436 | A1* | 7/2010 | Hellmann ........... B60W 30/146 701/96 |
| 2010/0222973 | A1* | 9/2010 | Senda ................... B60W 10/02 701/54 |
| 2010/0275610 | A1* | 11/2010 | Oguchi ................... F01K 13/02 60/773 |
| 2011/0066310 | A1* | 3/2011 | Sakai ........................ B60L 1/00 701/22 |
| 2011/0270451 | A1* | 11/2011 | Sakaguchi ................ F01N 5/04 700/288 |
| 2012/0232745 | A1* | 9/2012 | Ishiguro ................ F02D 41/123 701/33.1 |
| 2013/0317719 | A1* | 11/2013 | Ham ...................... B60K 31/00 701/96 |
| 2015/0113983 | A1* | 4/2015 | Yokono ................... F02B 37/18 60/605.1 |
| 2015/0298689 | A1* | 10/2015 | Schwartz ............. B60W 10/24 701/22 |
| 2016/0305353 | A1* | 10/2016 | Sase ....................... F02B 37/013 |

FOREIGN PATENT DOCUMENTS

| | | |
|---|---|---|
| DE | 19821902 A1 | 11/1999 |
| EP | 0786589 A1 | 7/1997 |
| JP | 11-324740 A | 11/1999 |
| JP | 2000-234550 A | 8/2000 |
| JP | 2007-168692 A | 7/2007 |
| JP | 2008-280991 A | 11/2008 |
| JP | 4415912 B2 | 2/2010 |

OTHER PUBLICATIONS

Lunze, "Auswirkung von Stellgrößenbeschränkungen," Regelungstechnik 1, Springer Verlag, Jan. 1, 2001, pp. 311-313 (2 pages total).

International Search Report and Written Opinion of the International Searching Authority (Forms PCT/ISA/237 and PCT/ISA/210), dated May 12, 2015, for International Application No. PCT/JP2015/053300 with an English translation.

* cited by examiner

AUXILIARY-MACHINE CONTROL DEVICE, CONTROL SYSTEM, TURBOCHARGER, CONTROL METHOD, AND PROGRAM

TECHNICAL FIELD

The present invention relates to an auxiliary-machine control device, a control system, a turbocharger, a control method, and a program.

Priority is claimed on Japanese Patent Application No. 2014-219435, filed on Oct. 28, 2014, the content of which is incorporated herein by reference.

BACKGROUND ART

There are vehicles each equipped with an engine provided with a supercharger such as a turbocharger. A turbocharger generates compressed air by rotating a turbine by using exhaust gas discharged from an engine, and rotating a compressor connected coaxially with the turbine. The turbocharger increases the output efficiency of the engine by supplying the compressed air to the engine.

In the case of an engine provided with a turbocharger, there is a case where an engine control system is provided with a main ECU (Electronic Control Unit) for mainly controlling the engine, and a sub ECU for controlling the turbocharger. In the control by the main ECU and the sub ECU, for example, a control method is adopted in which the main ECU provides a boost pressure command to the sub ECU and the sub ECU controls an operation of the turbocharger such that the boost pressure is obtained. In this method, the sub ECU achieves a target boost pressure by, for example, feedback control.

As a related technique, PTL 1 discloses a technique in which in an ECU composed of a main ECU and a sub ECU which are provided with computers independent of each other, the sub ECU performs control of a control target device independently from the main ECU at the time of a failure of the main ECU, or the like.

CITATION LIST

Patent Literature

[PTL 1] Japanese Patent No. 4415912

SUMMARY OF INVENTION

Technical Problem

Incidentally, in the feedback control described above, since a response is delayed or adjustment of a control gain is difficult or complicated in a multi-input and multi-output system, there is a case of adopting model predictive control in which each of the main ECU and the sub ECU performs control while predicting a behavior ahead of a predetermined time on the basis of different prediction models. In such a case, an operation of the turbocharger assumed by the main ECU is different from an actual operation of the turbocharger by the control of the sub ECU, and thus there is a possibility that engine control performance may deteriorate.

The present invention provides an auxiliary-machine control device, a control system, a turbocharger, a control method, and a program, in which it is possible to solve the above-mentioned problem.

Solution to Problem

According to a first aspect of the present invention, there is provided an auxiliary-machine control device including: an operation-amount calculation unit that acquires an operation command value, which is calculated by a main-machine control device that controls a main machine that is a power source, for an auxiliary machine which assists output of the main machine, and calculates an operation amount of control means for controlling an operation state of the auxiliary machine on the basis of the acquired operation command value; and an operation-amount determination unit that acquires an allowable range of the operation amount, which is calculated by the main-machine control device based on the operation amount, selects the calculated operation amount in a case where the operation amount calculated by the operation-amount calculation unit is within the allowable range, selects an upper limit value of the allowable range in a case where the calculated operation amount exceeds the allowable range, and selects a lower limit value of the allowable range in a case where the calculated operation amount falls below the allowable range.

According to a second aspect of the present invention, there is provided a control system including: the auxiliary-machine control device described above; and a main-machine control device which includes an operation-amount detection unit that detects an operation amount output from the operation-amount determination unit, and an allowable-range calculation unit that calculates an allowable range of the operation amount of the control means on the basis of a change rate of the detected operation amount.

According to a third aspect of the present invention, in a case where the change rate of the detected operation amount exceeds a predetermined threshold value, the allowable-range calculation unit sets the allowable range to a narrower range than in a case where the change rate of the detected operation amount is less than or equal to the threshold value.

According to a fourth aspect of the present invention, if the operation amount calculated by the operation-amount calculation unit becomes a value that is greater than an upper limit value of the allowable range by a predetermined value or more, or a value that is smaller than a lower limit value of the allowable range by a predetermined value or more, for a predetermined time or by a predetermined number of times or more, the allowable-range calculation unit sets a width of the allowable range to 0.

According to a fifth aspect of the present invention, the allowable-range calculation unit widens a width of the allowable range on the basis of a time during which the operation amount calculated by the operation-amount calculation unit falls within the allowable range, or a magnitude of a value deviating from the allowable range when the operation amount calculated by the operation-amount calculation unit falls outside of the allowable range.

According to a sixth aspect of the present invention, there is provided a turbocharger including: the above-described control system, in which the main-machine control device is a control device that performs control of an engine and the auxiliary-machine control device is a control device that performs control of the turbocharger which supplies compressed air to the engine.

According to a seventh aspect of the present invention, there is provided a control method for an auxiliary machine, including: a step of acquiring an operation command value, which is calculated by a main-machine control device that controls a main machine that is a power source, for an auxiliary machine which assists output of the main machine, and calculating an operation amount of control means for controlling an operation state of the auxiliary machine on the basis of the acquired operation command value; and a step of acquiring an allowable range of the operation amount, which is calculated by the main-machine control device based on the operation amount, selecting the calculated operation amount in a case where the calculated operation amount is within the allowable range, selecting an upper limit value of the allowable range in a case where the calculated operation amount exceeds the allowable range, and selecting a lower limit value of the allowable range in a case where the calculated operation amount falls below the allowable range.

According to an eighth aspect of the present invention, the control method further includes: a step of detecting the operation amount of the control means; and a step of calculating an allowable range of the operation amount of the control means on the basis of a change rate of the detected operation amount, in which determination of the operation amount is performed on the basis of an allowable range calculated in the step of calculating an allowable range of the operation amount.

According to a ninth aspect of the present invention, there is provided a program that causes a computer of a control system to function as: means for acquiring an operation command value, which is calculated by a main-machine control device that controls a main machine that is a power source, for an auxiliary machine which assists output of the main machine, and calculating an operation amount of control means for controlling an operation state of the auxiliary machine on the basis of the acquired operation command value; and means for acquiring an allowable range of the operation amount, which is calculated by the main-machine control device based on the operation amount, selecting the calculated operation amount in a case where the calculated operation amount is within the allowable range, selecting an upper limit value of the allowable range in a case where the calculated operation amount exceeds the allowable range, and selecting a lower limit value of the allowable range in a case where the calculated operation amount falls below the allowable range.

According to a tenth aspect of the present invention, the program further causes a computer of a control system to function as: means for detecting the operation amount of the control means; means for calculating an allowable range of the operation amount of the control means on the basis of a change rate of the detected operation amount; and means for performing determination of the operation amount on the basis of the calculated allowable range.

Advantageous Effects of Invention

According to the auxiliary-machine control device, the control system, the turbocharger, the control method, and the program described above, it is possible to utilize the performance of the turbocharger without impairing engine control performance.

DESCRIPTION OF EMBODIMENTS

First Embodiment

Hereinafter, a control system according to a first embodiment of the present invention will be described with reference to FIGS. 1 to 4, 6A, and 6B.

Figure 1:
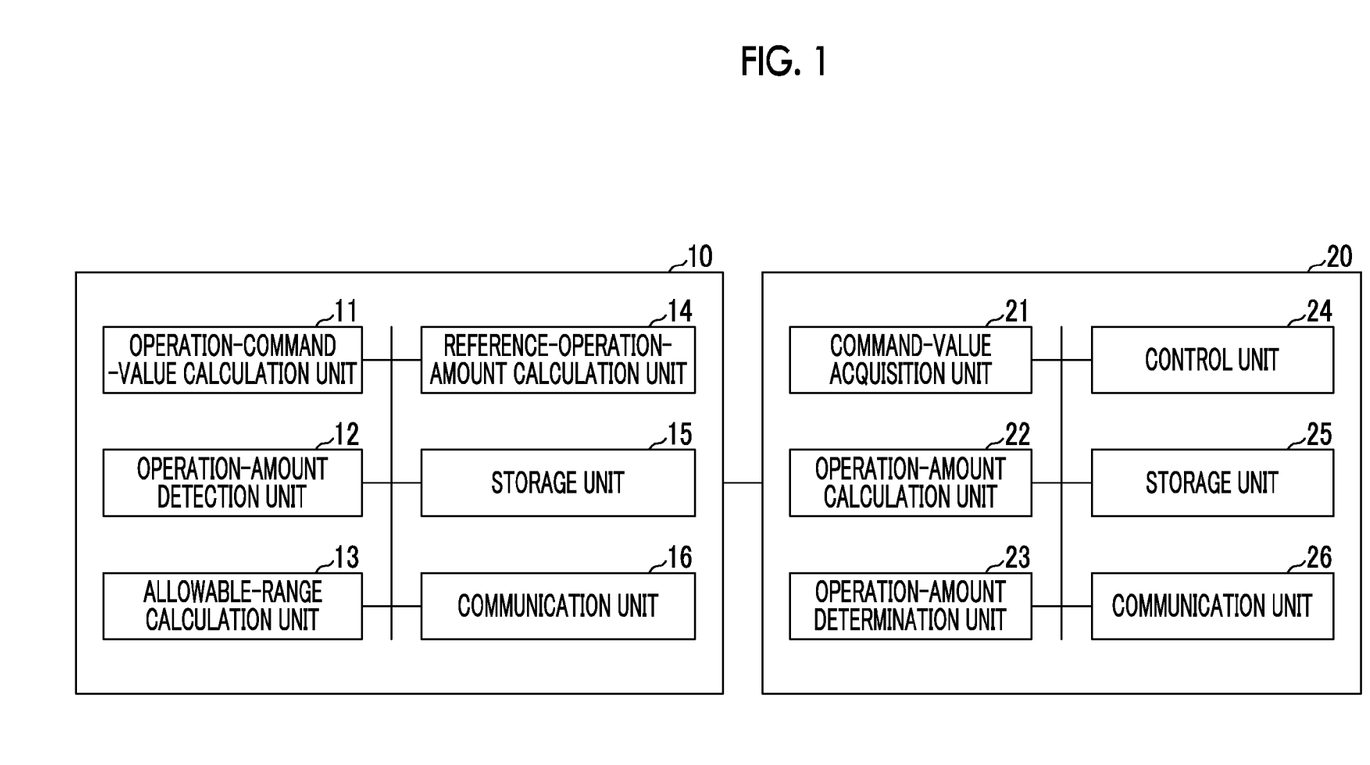
FIG. 1 is an example of a block diagram of a control system in a first embodiment according to the present invention.

FIG. 1 is an example of a block diagram of the control system in the first embodiment according to the present invention.

A control system 1 of this embodiment is a system for controlling an engine (hereinafter referred to as a turbo engine) equipped with a turbocharger of a vehicle or the like. The turbocharger is a type of supercharger which supplies compressed air generated by rotating a turbine by using exhaust gas discharged from the engine, and rotating a compressor connected coaxially with the turbine, to the engine. The control system 1 is configured to include a main ECU for mainly controlling the engine, and a sub ECU for controlling the turbocharger. The main ECU outputs a boost pressure command value of the turbocharger to the sub ECU in control of the output of the engine. The boost pressure is the pressure of the compressed air that the turbocharger feeds into the engine.

The sub ECU adjusts the valve opening degree of a turbine valve provided in a turbine inlet of the turbocharger and performs control such that the boost pressure reaches the command value. The relationship between the boost pressure and the valve opening degree has a relationship in which if the valve is throttled, the boost pressure increases, and if the valve is opened, the boost pressure decreases. Further, generally, if the boost pressure increases, the output of the engine increases, and if the boost pressure decreases, the output of the engine also decreases.

A main ECU 10 includes at least an operation-command-value calculation unit 11, an operation-amount detection unit 12, an allowable-range calculation unit 13, a reference-operation-amount calculation unit 14, a storage unit 15, and a communication unit 16.

The operation-command-value calculation unit 11 calculates an operation command value for an auxiliary machine which assists the output of a main machine that is a power source.

The operation-amount detection unit 12 detects the operation amount of control means for controlling the operating state of the auxiliary machine.

The allowable-range calculation unit 13 calculates an allowable range of the operation amount on the basis of a change in the operation amount detected by the operation-amount detection unit 12.

The reference-operation-amount calculation unit 14 calculates an operation amount serving as a reference, on the basis of the operation command value calculated by the operation-command-value calculation unit 11.

The storage unit 15 stores various types of data which are used for the calculation of the operation command value or the allowable range of the operation amount. Further, the storage unit 15 stores the operation amount detected by the operation-amount detection unit 12.

The communication unit 16 performs communication with the sub ECU by using a protocol such as a CAN.

In addition to these, the main ECU 10 has functions of controlling various mechanisms such as an ignition mechanism or a fuel system. However, in this specification, description thereof is omitted.

A sub ECU 20 includes at least a command-value acquisition unit 21, an operation-amount calculation unit 22, an operation-amount determination unit 23, a control unit 24, a storage unit 25, and a communication unit 26.

The command-value acquisition unit 21 acquires the operation command value for the auxiliary machine, and the allowable range of the operation amount for the control means for controlling the operating state of the auxiliary machine.

The operation-amount calculation unit 22 calculates the operation amount of the control means on the basis of the acquired operation command value.

The operation-amount determination unit 23 selects, in a case where the operation amount calculated by the operation-amount calculation unit 22 is within the allowable range acquired by the command-value acquisition unit 21, the calculated operation amount, and selects, in a case where the calculated operation amount exceeds the allowable range, the upper limit value of the allowable range of the operation amount, and selects, in a case where the calculated operation amount falls below the allowable range, the lower limit value of the allowable range.

The control unit 24 controls the control means with the operation amount selected by the operation-amount determination unit 23.

The storage unit 25 stores various types of data which are used for the calculation of the operation amount.

The communication unit 26 performs communication with the main ECU by using a protocol such as the CAN.

In this embodiment, the main machine is an engine and the auxiliary machine is a turbocharger. Further, the operation command value is a boost pressure command value. The control means for controlling the operating state of the auxiliary machine is a turbine valve, and the operation amount is the valve opening degree of the turbine valve.

In addition to these, the sub ECU 20 has functions of controlling various mechanisms of the turbocharger. However, in this specification, description thereof is omitted.

The main ECU in this embodiment predicts the valve opening degree of the turbine valve at a predetermined time ahead and calculates the boost pressure command value on the basis of the prediction. On the other hand, the sub ECU predicts the boost pressure command value at a predetermined time ahead and calculates the valve opening degree of the turbine valve on the basis of the prediction. Next, operations in a case where the main ECU and the sub ECU perform control according to the respective predictions will be described using FIGS. 6A and 6B.

Figure 6A:
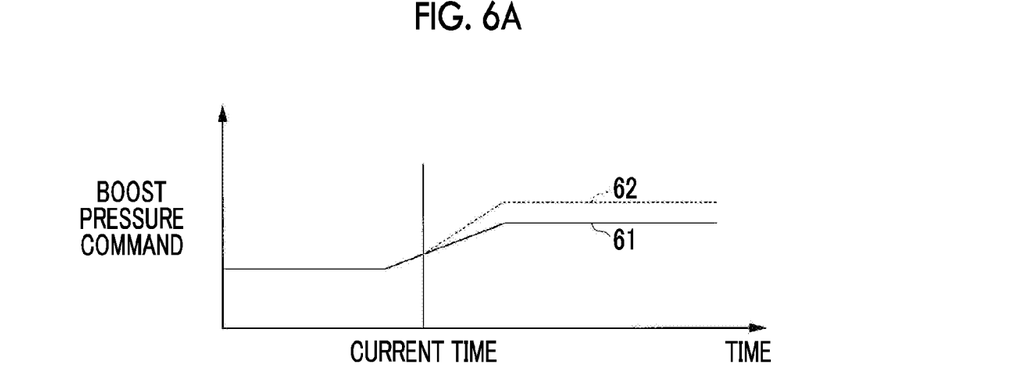
FIG. 6A is a first diagram describing an example of control of a turbo valve opening degree by the main ECU and the sub ECU in the related art.
Figure 6B:
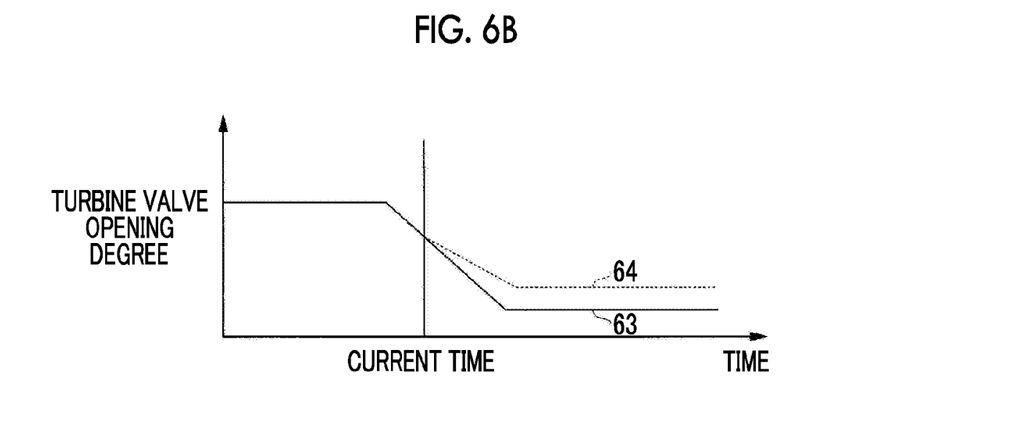
FIG. 6B is a second diagram describing an example of control of the turbo valve opening degree by the main ECU and the sub ECU in the related art.

FIG. 6A is a first diagram describing an example of control of a turbo valve opening degree by the main ECU and the sub ECU in the related art. FIG. 6B is a second diagram describing an example of control of the turbo valve opening degree by the main ECU and the sub ECU in the related art.

FIG. 6A is a time series graph of a boost pressure command value. A boost pressure command value 61 indicates the behavior of a boost pressure command value that the main ECU 10 outputs to the sub ECU 20. A boost pressure command value 62 indicates the behavior of a boost pressure command value predicted by the sub ECU 20 on the basis of the boost pressure command value acquired from the main ECU 10 and a prediction model that the sub ECU 20 has.

FIG. 6B is a time series graph of a turbine valve opening degree. A valve opening degree 63 indicates the behavior of a valve opening degree command value that the sub ECU 20 outputs to the turbine valve. A valve opening degree 64 indicates the behavior of a valve opening degree command value predicted by the main ECU 10 on the basis of the boost pressure command value output to the sub ECU 20 and a prediction model that the main ECU 10 has.

The main ECU 10 predicts the behavior of a valve opening degree of the turbine valve, such as the valve opening degree 64, calculates the boost pressure command value, and outputs it to the sub ECU 20. However, the sub ECU 20 predicts that the main ECU 10 outputs a boost pressure command value such as the boost pressure command value 62, calculates a valve opening degree such as the valve opening degree 63, and controls the turbine valve.

As shown in FIGS. 6A and 6B, if the main ECU 10 and the sub ECU 20 respectively independently perform the controls of the engine and the control of the turbocharger, the main ECU 10 cannot control the engine, as predicted, and there is a possibility that a problem such as the main ECU 10 determining that the boost pressure controlled by the sub ECU 20 is abnormal may occur.

In this embodiment, in order to prevent this problem, the main ECU 10 limits the control of the sub ECU 20 with respect to the turbine valve so as to fall within an allowable range which is set by the main ECU 10. In this way, the main ECU 10 is made so as to be able to control the engine within a prediction range. Further, if it is within an allowable range, the main ECU 10 leaves the control of the turbine valve to the sub ECU 20. In this way, it is possible to more effectively operate the turbocharger.

There is a case where the engine and the turbocharger are manufactured by different manufacturers. In such a case, it is conceivable that the manufacturer of the engine manufactures the main ECU and the manufacturer of the turbocharger manufactures the sub ECU. The manufacturer of the turbocharger can grasp the operation of the turbocharger, and therefore, it is possible to design the sub ECU such that the performance of the turbocharger can be extracted well. Therefore, in order to more effectively utilize the performance of the turbocharger, the main ECU leaves the control of the valve opening degree to the sub ECU on condition that it is within the allowable range.

Next, the control of the turbine valve by the main ECU 10 and the sub ECU 20 in this embodiment will be described using FIGS. 2A, 2B, and 3.

Figure 2A:
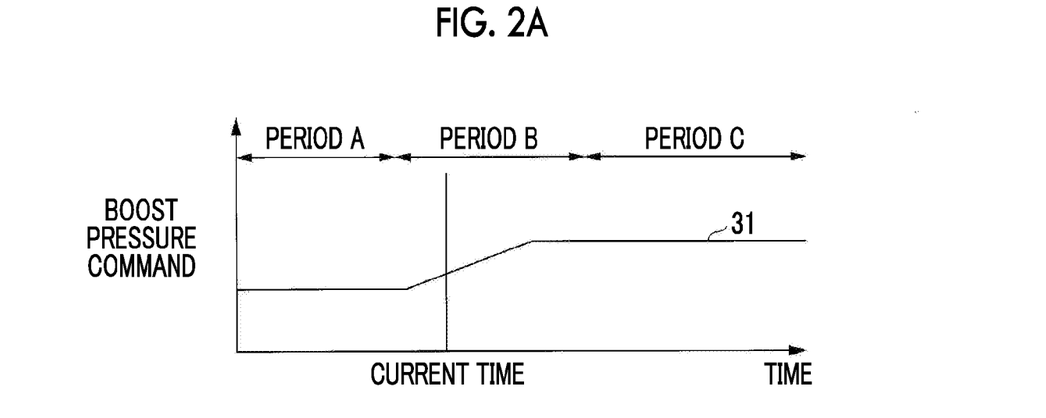
FIG. 2A is a first diagram describing an example of control of a turbine valve by a main ECU and a sub ECU in the first embodiment according to the present invention.
Figure 2B:
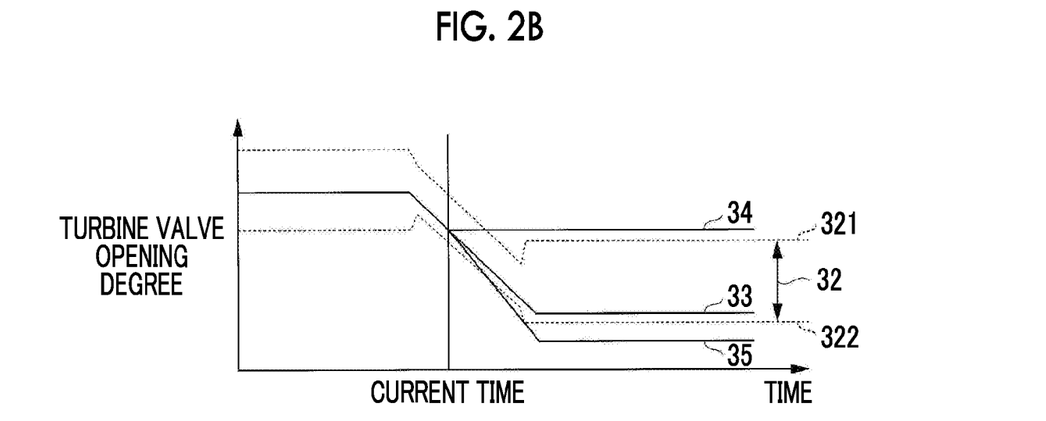
FIG. 2B is a second diagram describing an example of control of the turbine valve by the main ECU and the sub ECU in the first embodiment according to the present invention.

FIG. 2A is a first diagram describing an example of control of the turbine valve by the main ECU and the sub ECU in the first embodiment according to the present invention. FIG. 2B is a second diagram describing an example of control of the turbine valve by the main ECU and the sub ECU in the first embodiment according to the present invention.

FIG. 2A is a time series graph of a boost pressure command value. A boost pressure command value 31 indicates the behavior of a boost pressure command value that the main ECU 10 outputs to the sub ECU 20. FIG. 2B is a time series graph of a turbine valve opening degree. An allowable range 32 indicates an area surrounded by a broken line. This area (the allowable range 32) is an allowable range of the valve opening degree of the turbine valve calculated by the main ECU 10. In a case where the boost pressure command value 31 is constant (a period A and a period C), an allowable range which is calculated by the allowable-range calculation unit 13 of the main ECU is wide. On the other hand, in a transitional scene (a period B) in which the boost pressure command value changes, an allowable range which is calculated by the allowable-range calculation unit 13 becomes narrow. This is for preventing a vehicle from stalling or accelerating too much due to the sub ECU 20 performing valve opening degree control that is too different from the operation of the engine which is controlled by the main ECU 10, during the acceleration of a vehicle speed, for example.

Valve opening degrees 33 to 35 show examples of the valve opening degrees calculated by the operation-amount calculation unit 22 of the sub ECU 20 on the basis of the boost pressure command value (FIG. 2A) acquired from the main ECU 10. The valve opening degree 33 is an example in a case where the operation amount calculated by the operation-amount calculation unit 22 falls within the allowable range 32. The valve opening degree 34 is an example in a case where the operation amount calculated by the operation-amount calculation unit 22 exceeds the upper limit value of the allowable range 32. The valve opening degree 35 is an example in a case where the operation amount calculated by the operation-amount calculation unit 22 falls below the lower limit value of the allowable range 32.

In a case where a correction amount calculated by the operation-amount calculation unit 22 falls within the allowable range 32 like the valve opening degree 33, the operation-amount determination unit 23 of the sub ECU 20 determines the operation amount calculated by the operation-amount calculation unit 22 as being the valve opening degree command value of the turbine valve and outputs it to the control unit 24. Further, in a case where the calculated operation amount exceeds the upper limit value of the allowable range 32 like the valve opening degree 34, the operation-amount determination unit 23 determines an upper limit value 321 of the allowable range 32 as being the valve opening degree command value of the turbine valve and outputs it to the control unit 24. Further, in a case where the calculated operation amount falls below the lower limit value of the allowable range 32 like the valve opening degree 35, the operation-amount determination unit 23 determines a lower limit value 322 of the allowable range 32 as being the valve opening degree command value of the turbine valve and outputs it to the control unit 24.

Figure 3:
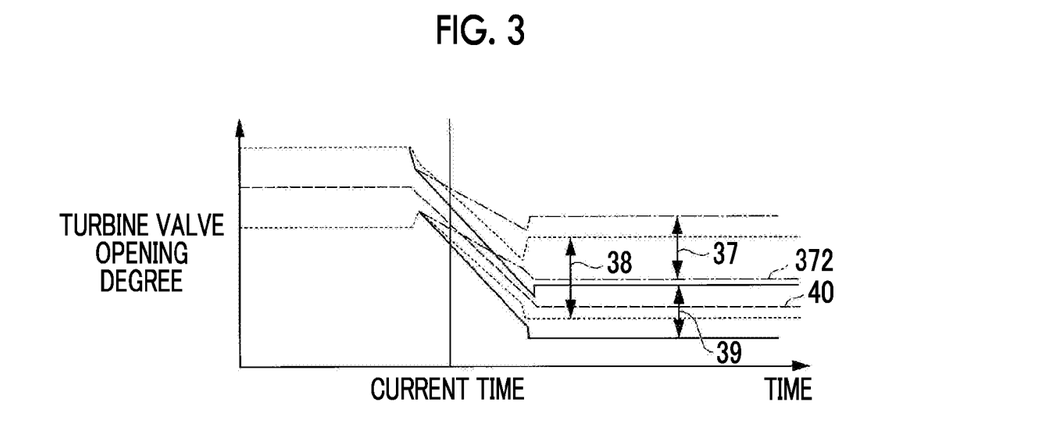
FIG. 3 is a third diagram describing an example of control of the turbine valve by the main ECU and the sub ECU in the first embodiment according to the present invention.

FIG. 3 is a third diagram describing an example of control of the turbine valve by the main ECU and the sub ECU in the first embodiment according to the present invention.

In this embodiment, the allowable range which is set by the main ECU may be made such that a plurality of types of allowable ranges are prepared and a user can select it according to preference. FIG. 3 shows examples of a plurality of types of allowable ranges.

Allowable ranges 37 to 39 show a plurality of allowable ranges which are calculated by the allowable-range calculation unit 13 on the basis of the boost pressure command value (for example, FIG. 2A) calculated by the main ECU 10. The allowable range 37 is an example of an allowable range in a case of performing control to slowly throttle the turbine valve according to an increase in the boost pressure command value. The allowable range 39 is an example of an allowable range in a case of performing control to rapidly throttle the turbine valve according to an increase in the boost pressure command value. The allowable range 38 is an example of an allowable range in a case of performing control to throttle the turbine valve in an intermediate manner according to an increase in the boost pressure command value. A configuration is made such that with respect to the same change in the boost pressure, a plurality of allowable ranges are stored in the storage unit 15 and a user can select an operation mode from among them according to his own preference. For example, a user who prefers a rapid response to a depression operation of an accelerator pedal or a brake pedal can select the allowable range 39, a user who prefers a slow response can select the allowable range 37, and a user who prefers a standard response can select the allowable range 38. For example, in a case where a user has selected the allowable range 37, even if the operation-amount calculation unit 22 of the sub ECU 20 calculates an operation amount such as a valve opening degree 40, the operation-amount determination unit 23 determines a lower limit value 372 of the allowable range 37 as being the valve opening degree command value, and the control unit 24 controls the valve opening degree of the turbine valve with the lower limit value of the allowable range 37. In this way, it is possible to realize the traveling of a vehicle by a slow response that a user who has selected the allowable range 38 desires.

It is assumed that appropriate values confirmed by a driving test or the like of a vehicle are set for the plurality of allowable ranges.

Figure 4:
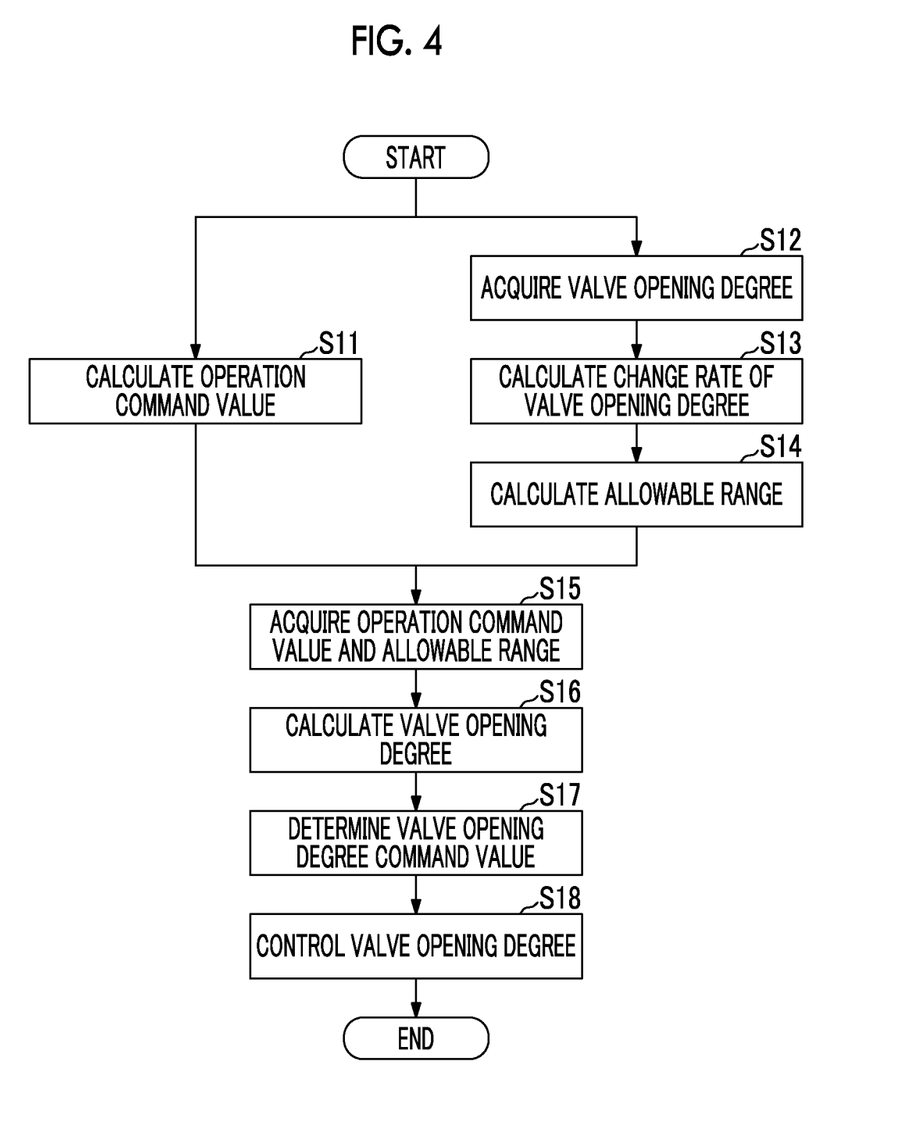
FIG. 4 is an example of a flowchart of control of a turbo valve opening degree of a control system in the first embodiment according to the present invention.

FIG. 4 is an example of a flowchart of control of a turbo valve opening degree of the control system in the first embodiment according to the present invention.

First, the operation-command-value calculation unit 11 of the main ECU 10 calculates the boost pressure command value on the basis of a drive operation (for example, depression of an accelerator pedal) of a user. For example, a table in which an engine speed and a boost pressure command value are correlated with each other, a calculation formula for correcting a boost pressure command value on the basis of the prediction of a change in a valve opening degree, or the like is stored in the storage unit 15, and the operation-command-value calculation unit 11 calculates a boost pressure command value on the basis of the table or the calculation formula (Step S11). The operation-command-value calculation unit 11 transmits the calculated boost pressure command value to the sub ECU 20 through the communication unit 16. Further, the reference-operation-amount calculation unit 14 calculates a valve opening degree (a reference valve opening degree) serving as a reference, on the basis of the boost pressure command value.

A table in which the boost pressure command value and the reference valve opening degree are correlated with each other, or the like is stored in the storage unit 15, and the reference-operation-amount calculation unit 14 calculates the reference valve opening degree on the basis of the table.

In parallel with Step S11, the operation-amount calculation unit 22 calculates an allowable range of the valve opening degree (Steps S12 to S14). First, the operation-amount detection unit 12 acquires the valve opening degree of the turbine valve (for example, the valve opening degree command value determined by the operation-amount determination unit 23) from the sub ECU 20 at predetermined time intervals through the communication unit 16 (Step S12). The operation-amount detection unit 12 records the acquired valve opening degree in association with an acquisition time thereof in the storage unit 15. Next, the allowable-range calculation unit 13 calculates a change rate per unit time of the valve opening degree from time series information on the valve opening degree recorded in the storage unit 15 (Step S13).

Next, the allowable-range calculation unit 13 calculates the allowable range of the valve opening degree of the turbine valve on the basis of the calculated change rate of the valve opening degree and the boost pressure command value calculated by the operation-command-value calculation unit 11. For example, in the storage unit 15, an upper limit value and a lower limit value of the valve opening degree are stored for each of the boost pressure command value and the change rate of the valve opening degree, and the allowable-range calculation unit 13 calculates the allowable range by performing interpolation calculation or the like on the basis of these values (Step S14). As described above, if the change rate of the valve opening degree in an immediately preceding predetermined period is less than or equal to a predetermined threshold value, the traveling of a vehicle is regarded as a steady state, and an upper limit value and a lower limit value are set in the storage unit 15 such that the width of the allowable range of the valve opening degree which is calculated by the allowable-range calculation unit 13 is widened. On the other hand, in a case where the change rate of the valve opening degree in an immediately preceding predetermined period exceeds the predetermined threshold value, the traveling state is regarded as being in a transient state, and an upper limit value and a lower limit value are set in the storage unit 15 such that the width of the allowable range of the valve opening degree which is calculated by the allowable-range calculation unit 13 is narrowed. The upper limit value and the lower limit value of the allowable range of the valve opening degree which is calculated by the allowable-range calculation unit 13 may be set with specific numerical values of the valve opening degree (if the valve opening degree in a range of 50% to 60% is within an allowable range, the upper limit value is 60% and the lower limit value is 50%), or may be set as the ratio (±10%) to a certain reference value (for example, the reference valve opening degree calculated by the reference-operation-amount calculation unit 14). The allowable-range calculation unit 13 transmits the calculated upper limit value ad lower limit value of the valve opening degree to the sub ECU 20 through the communication unit 16. Alternatively, the allowable-range calculation unit 13 transmits the reference valve opening degree and a ratio (an allowable range) based on the reference valve opening degree to the sub ECU 20 through the communication unit 16.

In the sub ECU 20, the command-value acquisition unit 21 acquires the boost pressure command value calculated by the operation-command-value calculation unit 11, the values of the upper limit value and the lower limit value of the valve opening degree calculated by the allowable-range calculation unit 13, and the reference valve opening degree calculated by the reference-operation-amount calculation unit 14 and writes them in the storage unit 25 (Step S15). Next, the operation-amount calculation unit 22 reads the boost pressure command value of the storage unit 25 and calculates the valve opening degree of the turbine valve (Step S16). For example, a table in which the boost pressure command value and the valve opening degree are correlated with each other, a calculation formula for correcting the valve opening degree on the basis of the prediction of a change in the boost pressure command value, or the like is stored in the storage unit 25, and the operation-amount calculation unit 22 calculates a valve opening degree according to the operation command value acquired by the command-value acquisition unit 21, on the basis of the table or the calculation formula. The operation-amount calculation unit 22 outputs the calculated valve opening degree to the operation-amount determination unit 23. Next, the operation-amount determination unit 23 determines a valve opening degree command value (Step S17). Specifically, the operation-amount determination unit 23 reads the upper limit value and the lower limit value of the valve opening degree from the storage unit 25 and compares them with the valve opening degree calculated by the operation-amount calculation unit 22. In a case where the valve opening degree calculated by the operation-amount calculation unit 22 is less than or equal to the read upper limit value and greater than or equal to the read lower limit value, the operation-amount determination unit 23 determines the valve opening degree calculated by the operation-amount calculation unit 22 as being the valve opening degree command value. Further, in a case where the valve opening degree calculated by the operation-amount calculation unit 22 exceeds the read upper limit value, the operation-amount determination unit 23 determines the upper limit value as being the valve opening degree command value. Further, in a case where the valve opening degree calculated by the operation-amount calculation unit 22 falls below the read lower limit value, the operation-amount determination unit 23 determines the lower limit value as being the valve opening degree command value. In a case where the reference valve opening degree, the ratio to the reference valve opening degree, and the allowable range are given, the operation-amount determination unit 23 calculates an upper limit value and a lower limit value from the reference valve opening degree and the ratio to the reference valve opening degree. For example, if the reference valve opening degree is 50% and the ratio to the reference valve opening degree is ±10%, the upper limit value is 55% and the lower limit value is 45%. The operation-amount determination unit 23 outputs the determined valve opening degree command value to the control unit 24. The control unit 24 controls the valve opening degree of the turbine valve by the valve opening degree command value determined by the operation-amount determination unit 23 (Step S18).

According to this embodiment, since the sub ECU is not completely autonomous and operates within a restriction of the main ECU 10, the control performance of the engine control of the main ECU 10 is not impaired. On the other hand, if it is within the restriction, the sub ECU 20 can freely perform control of the turbocharger, and therefore, even in a case where the sub ECU 20 can execute more excellent control than the main ECU 10, it is possible to take advantage of excellent control performance by the sub ECU 20. In this way, it is possible to achieve both of effective utilization of the sub ECU 20 and securing of safety and reliability by the main ECU 10.

Further, for example, even in a case where the sub ECU 20 is tuned so as to perform high response control, tuning to an intermediate response can also be made according to the allowable range of the valve opening degree that the main ECU 10 provides to the sub ECU 20. Further, as described in FIG. 3, a plurality of allowable ranges can be prepared such that selection by a user is possible.

Further, in the example described above, description has been made using an example of controlling the valve opening degree of the turbine valve. However, for example, according to the configuration of the turbocharger, for example, in the case of a configuration in which the inflow amount of exhaust gas to a turbine is adjusted by a bypass valve, this embodiment may be applied to control of the valve opening degree of the bypass valve. Alternatively, in the case of an electric turbocharger, this embodiment may be applied to motor torque control of a motor device.

Second Embodiment

Hereinafter, a control system according to a second embodiment of the present invention will be described with reference to FIG. 5.

Figure 5:
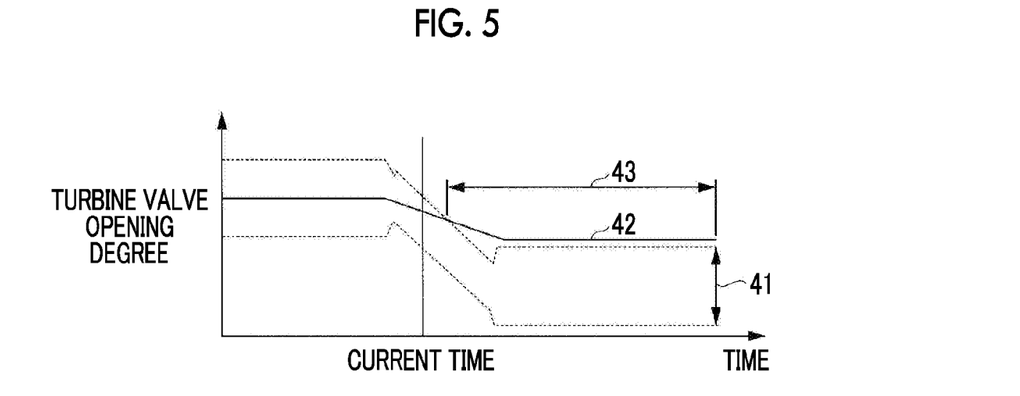
FIG. 5 is a diagram describing an example of control of the turbine valve by the main ECU and the sub ECU in a second embodiment according to the present invention.

FIG. 5 is a diagram describing an example of control of the turbine valve by the main ECU and the sub ECU in the second embodiment according to the present invention.

An allowable range 41 indicates a plurality of allowable ranges which are calculated by the allowable-range calculation unit 13 on the basis of the boost pressure command value (for example, FIG. 2A) calculated by the main ECU 10.

A valve opening degree 42 indicates the valve opening degree calculated by the operation-amount calculation unit 22 of the sub ECU 20 on the basis of the boost pressure command value.

In this embodiment, the operation-amount detection unit 12 also acquires the valve opening degree which is calculated by the operation-amount calculation unit 22, from the sub ECU 20. Then, the allowable-range calculation unit 13 determines whether or not the valve opening degree calculated by the operation-amount calculation unit 22 and acquired by the operation-amount detection unit 12 is within an allowable range that is calculated by itself. Then, for example, in a case where the valve opening degree calculated by the operation-amount calculation unit 22 falls outside of the allowable range set by the main ECU 10 for a predetermined period of time 43 or more, the main ECU 10 determines that an abnormality has occurred in the sub ECU 20, and the allowable-range calculation unit 13 sets the allowable range such that the width between the upper limit value and the lower limit value of the allowable range becomes zero. Then, the allowable-range calculation unit 13 transmits the reference valve opening degree calculated by the reference-operation-amount calculation unit 14 and the allowable range (width=0) to the sub ECU 20. For example, in a case where the reference valve opening degree is 50%, the allowable-range calculation unit 13 transmits 50% and the ratio, 0%, of the allowable range based thereon to the sub ECU 20. Alternatively, the allowable-range calculation unit 13 transmits the upper limit value, 50%, and the lower limit value, 50%, to the sub ECU 20.

In sub ECU 20, the operation-amount determination unit 23 determines a valve opening degree command value from information on the reference valve opening degree or the upper limit value (equal to the lower limit value) acquired from the main ECU. At this time, the valve opening degree which is calculated by the operation-amount calculation unit 22 is invalidated by the allowable range acquired from the main ECU 10. The control unit 24 controls the turbine valve on the basis of the valve opening degree which is designated by the main ECU 10. That is, control of the valve opening degree of the turbocharger is performed substantially at the initiative of the main ECU 10.

In this way, even in a case where the sub ECU 20 performs improper calculation of the valve opening degree due to an abnormality of a sensor connected to the sub ECU 20, a failure of hardware, or the like, it is possible to avoid the operation being actually performed.

The determination of an abnormality of the sub ECU 20 may be made based on the number of times that the valve opening degree calculated by the allowable-range calculation unit 13 falls outside of the allowable range for a predetermined period of time. Alternatively, in a case where the gap between the value when exceeding the upper limit value of the allowable range and the upper limit value is greater than or equal to a predetermined threshold value, or in a case where the gap between the value when falling below the lower limit value and the lower limit value is greater than or equal to a predetermined threshold value, it may be determined that it is a failure.

Further, conversely, in a case where it is determined that the performance and reliability of control by the sub ECU 20 are high, means for substantially invalidating the restriction of the operation of the sub ECU 20 by the main ECU 10 may be prepared. Substantially invalidating the restriction of the main ECU 10 is an allowable range, in which the upper limit value is 100% and the lower limit value is 0%, for example, in a case of providing the upper limit value and the lower limit value of the allowable range to the valve opening degree, being stored in the storage unit 15.

For example, the allowable range provided by the main ECU 10 and the valve opening degree calculated by the operation-amount calculation unit 22 of the sub ECU 20 are compared with each other for a predetermined period of time, and if the valve opening degree calculated by the operation-amount calculation unit 22 is within the allowable range for a period of 90% or more, it is determined that reliability is high, and a choice of an operation mode that can substantially invalidate the restriction may be presented to a user. Further, for example, the allowable range provided by the main ECU 10 and the valve opening degree calculated by the operation-amount calculation unit 22 of the sub ECU 20 are compared with each other for a predetermined period of time, and in a case where the difference between the valve opening degree calculated by the operation-amount calculation unit 22 and the upper limit value or the lower limit value of the allowable range when the valve opening degree deviates from the allowable range is less than or equal to a predetermined threshold value (for example, when the threshold value is 3% and the lower limit value is 20%, the calculated valve opening degree is 18% or the like), a choice of an operation mode that can substantially invalidate the restriction may be presented to a user. If a user selects these operation modes, the sub ECU 20 performs the control of the boost pressure of the turbocharger. For example, in a case where the sub ECU 20 is tuned so as to perform high response control and a user also desires a high response, this operation mode is selected, and if it is determined that the reliability of the valve opening degree which is calculated by the sub ECU 20 is high, a user can perform driving better suited for preference.

Substantially invalidating the restriction is an example, and there is no limitation thereto. For example, in a case where the conditions as described above are satisfied, an operation mode of widening the width of the allowable range by 10% may be presented.

Further, a correction to widen or narrow the allowable range according to the preference of a user may be able to be performed. For example, a configuration may be made in such a manner that the valve opening degree which is calculated by the sub ECU 20 is tuned to the high response side, and in a case where a user desires a higher response than an operation mode by the tuned high response, a button or the like for "a higher response" is provided in a user interface that a user can operate, and if the user presses the button, on the basis of the operation of the user, the allowable-range calculation unit 13 newly writes the setting of the allowable range to increase the upper limit value of the operation mode by the tuned high response set in advance by a predetermined value to the extent that safety can be secured, and decrease the lower limit value by a predetermined value, in the storage unit 15, and provides the allowable range to the sub ECU 20. In this way, it is possible to extract the performance of the turbocharger by flexibly changing the allowable range according to the preference of a user or a riding environment of a user.

The process of the processing in each of the main ECU 10 and the sub ECU 20 described above is stored in a computer-readable record medium in the form of a program, and this program is read and executed by the computers of the main ECU 10 and the sub ECU 20, whereby the above processing is performed. Here, the computer-readable record medium refers to a magnetic disk, a magneto-optical disk, a CD-ROM, a DVD-ROM, a semiconductor memory, or the like. Further, a configuration may be made such that the computer program is delivered to a computer through a communication line and the computer having received the delivery executes the program.

Further, the above-described program may be a program for realizing some of the above-described functions. Further, it may be a so-called difference file (differential program) which can realize the above-described functions by a combination with a program already recorded in a computer system.

Further, the main ECU 10 and the sub ECU 20 may be configured with a single computer or may be configured with a plurality of computers connected so as to be able to communicate with each other.

In addition, it is possible to appropriately replace the constituent elements in the above-described embodiments with well-known constituent elements within a scope which does not depart from the gist of the present invention. Further, the technical scope of the present invention is not limited to the above-described embodiments, and it is possible to add various changes thereto within a scope which does not depart from the gist of the present invention. For example, a configuration is also conceivable in which the function of the allowable-range calculation unit 13 is mounted on the sub ECU 20. For example, the control system 1 may be applied to an exhaust gas recirculation (EGR) system. The sub ECU 20 is an example of the auxiliary-machine control device, and the main ECU 10 is an example of the main-machine control device. The turbocharger is an example of a supercharger.

INDUSTRIAL APPLICABILITY

According to the auxiliary-machine control device, the control system, the turbocharger, the control method, and the program described above, it is possible to utilize the performance of the turbocharger without impairing engine control performance.

REFERENCE SIGNS LIST

1: control system
10: main ECU
11: operation-command-value calculation unit
12: operation-amount detection unit
13: allowable-range calculation unit
14: reference-operation-amount calculation unit
15: storage unit
16: communication unit
20: sub ECU
21: command-value acquisition unit
22: operation-amount calculation unit
23: operation-amount determination unit
24: control unit
25: storage unit
26: communication unit

The invention claimed is:

1. A control system comprising:
a main-machine control device for controlling a main machine as a power source, and
an auxiliary-machine control device for controlling an auxiliary machine for assisting an output of the main machine,
wherein the auxiliary-machine control which includes an operation-amount calculation unit that acquires an operation command value, which is calculated by a main-machine control device that controls a main machine that is a power source, for an auxiliary machine which assists output of the main machine, and calculates an operation amount of control to control an operation state of the auxiliary machine on the basis of the acquired operation command value; and
an operation-amount determination unit that acquires an allowable range of the operation amount, which is calculated by the main-machine control device based on the operation amount, selects the calculated operation amount in a case where the operation amount calculated by the operation-amount calculation unit is within the allowable range, selects an upper limit value of the allowable range in a case where the calculated operation amount exceeds the allowable range, and selects a lower limit value of the allowable range in a case where the calculated operation amount falls below the allowable range,
wherein the main-machine control device which includes an operation-command value calculation unit calculates the operation command value on the basis of a prediction of a control performed by the auxiliary-machine control device,
an operation-amount detection unit that detects an operation amount output from the operation-amount determination unit, and
an allowable-range calculation unit that calculates an allowable range of the operation amount of the control means on the basis of the operation command value and a change rate of the detected operation amount.

2. The control system according to claim 1, wherein in a case where the change rate of the detected operation amount exceeds a predetermined threshold value, the allowable-range calculation unit sets the allowable range to a narrower range than in a case where the change rate of the detected operation amount is less than or equal to the threshold value.

3. The control system according to claim 2, wherein if the operation amount calculated by the operation-amount calculation unit becomes a value that is greater than an upper limit value of the allowable range by a predetermined value or more, or a value that is smaller than a lower limit value of the allowable range by a predetermined value or more, for a predetermined time or by a predetermined number of times or more, the allowable-range calculation unit sets a width of the allowable range to 0.

4. The control system according to claim 2, wherein the allowable-range calculation unit widens a width of the allowable range on the basis of a time during which the operation amount calculated by the operation-amount calculation unit falls within the allowable range, or a magnitude of a value deviating from the allowable range when the operation amount calculated by the operation-amount calculation unit falls outside of the allowable range.

5. The control system according to claim 1, wherein if the operation amount calculated by the operation-amount calculation unit becomes a value that is greater than an upper limit value of the allowable range by a predetermined value or more, or a value that is smaller than a lower limit value of the allowable range by a predetermined value or more, for a predetermined time or by a predetermined number of times or more, the allowable-range calculation unit sets a width of the allowable range to 0.

6. The control system according to claim 5, wherein the allowable-range calculation unit widens a width of the allowable range on the basis of a time during which the operation amount calculated by the operation-amount calculation unit falls within the allowable range, or a magnitude of a value deviating from the allowable range when the operation amount calculated by the operation-amount calculation unit falls outside of the allowable range.

7. The control system according to claim 1, wherein the allowable-range calculation unit widens a width of the allowable range on the basis of a time during which the operation amount calculated by the operation-amount calculation unit falls within the allowable range, or a magnitude of a value deviating from the allowable range when the operation amount calculated by the operation-amount calculation unit falls outside of the allowable range.

8. A turbocharger comprising:
a control system,
wherein the control system includes a main-machine control device for controlling a main machine as a power source and an auxiliary-machine control device for controlling an auxiliary machine for assisting an output of the main machine,
wherein the auxiliary-machine control device which includes
an operation-amount calculation unit that acquires an operation command value, which is calculated by the main-machine control device, for an auxiliary machine, on the basis of a prediction of control performed by the auxiliary-machine control device, and calculates an operation amount of control to control an operation state of the auxiliary machine on the basis of the acquired operation command value and a prediction of a change in the operation command value; and
an operation-amount determination unit that acquires an allowable range of the operation amount, which is calculated by the main-machine control device on the basis of a control performed by the auxiliary-machine control device, selects the calculated operation amount in a case where the operation amount calculated by the operation-amount calculation unit is within the allowable range, selects an upper limit value of the allowable range in a case where the calculated operation amount exceeds the allowable range, and selects a lower limit value of the allowable range in a case where the calculated operation amount falls below the allowable range,
wherein the main-machine control device which includes
an operation-command-value calculation unit calculates the operation command value on the basis of a prediction of a control performed by the auxiliary-machine control device,
an operation-amount detection unit that detects an operation amount output from the operation-amount determination unit, and
an allowable-range calculation unit that calculates an allowable range of the operation amount of the control means on the basis of the operation command value and a change rate of the detected operation amount, and
wherein the main-machine control device is a control device that performs control of an engine and the auxiliary-machine control device is a control device that performs control of the turbocharger which supplies compressed air to the engine.

9. The turbocharger according to claim 8:
wherein in a case where the change rate of the detected operation amount exceeds a predetermined threshold value, the allowable-range calculation unit sets the allowable range to a narrower range than in a case where the change rate of the detected operation amount is less than or equal to the threshold value.

10. The turbocharger according to claim 8:
wherein if the operation amount calculated by the operation-amount calculation unit becomes a value that is greater than an upper limit value of the allowable range by a predetermined value or more, or a value that is smaller than a lower limit value of the allowable range by a predetermined value or more, for a predetermined time or by a predetermined number of times or more, the allowable-range calculation unit sets a width of the allowable range to 0.

11. A control method for an auxiliary machine in a control system including a main-machine control device for controlling a main machine as a power source and the auxiliary-machine control device for controlling an auxiliary machine for assisting an output of the main machine, the auxiliary-machine control device, the control method comprising:
an operation-amount calculation step of acquiring an operation command value, which is calculated by the a main-machine control device, for an auxiliary machine, on the basis of a prediction of control performed by the auxiliary-machine control device, and calculating an operation amount of control to control an operation state of the auxiliary machine on the basis of the acquired operation command value and a prediction of a change in the operation command value;
an operation-amount determination step of acquiring an allowable range of the operation amount, which is calculated by the main-machine control device on the basis of a control performed by the auxiliary-machine control device, selecting the calculated operation amount in a case where the calculated operation amount is within the allowable range, selecting an upper limit value of the allowable range in a case where the calculated operation amount exceeds the allowable range, and selecting a lower limit value of the allowable range in a case where the calculated operation amount falls below the allowable range;
an operation-command-value calculation step of calculating the operation command value on the basis of a prediction of a control performed by the auxiliary-machine control device;
a step of detecting the operation amount of the control means; and an allowable-range calculation step of calculating an allowable range of the operation amount of the control means on the basis of a change rate of the detected operation amount, wherein determination of the operation amount is performed on the basis of the operation command value and an allowable range calculated in the step of calculating an allowable range of the operation amount, and wherein acquiring the operation command value which is calculated in the operation-command-value calculation step is performed in the operation-amount calculation step, and wherein acquiring the allowable range calculated in the allowable-range calculation is performed in the operation-amount determination step.

* * * * *